Feb. 14, 1933.  A. L. ELLIS  1,897,468
DRIVING MECHANISM FOR RECIPROCATING MACHINES
Filed Oct. 28, 1931  5 Sheets-Sheet 1

Fig. 1.

INVENTOR
ARTHUR L. ELLIS
BY
ATTORNEYS

Patented Feb. 14, 1933

1,897,468

UNITED STATES PATENT OFFICE

ARTHUR L. ELLIS, OF NEW ROCHELLE, NEW YORK, ASSIGNOR TO THE WATERBURY TOOL COMPANY, OF WATERBURY, CONNECTICUT, A CORPORATION OF CONNECTICUT

DRIVING MECHANISM FOR RECIPROCATING MACHINES

Application filed October 28, 1931. Serial No. 571,570.

The invention relates to driving mechanisms and more particularly to hydraulic driving mechanisms for reciprocating machines as exemplified, for instance, by machine tools of the type that include a reciprocating member, for example, the ram of a broaching machine, shaper or the like, for moving the cutting tool through or across the work, or machine tools of the class wherein the work is carried to the tool upon a reciprocating table as in planers or the like.

The object of the invention is to provide an efficient and simple construction whereby a plurality of operative or cutting speeds are provided and whereby the ranges of said operative or cutting speeds may be selectively varied independently of the return stroke or its equivalent.

The invention contemplates further the provision of an arrangement in which the speed of the inoperative or return stroke or its equivalent may be varied independently of the speed of the operative or cutting stroke.

Other objects will appear from the description hereinafter and the features of novelty will be pointed out in the claims.

In the accompanying drawings, which illustrate an example of the invention without defining its limits.

Figure 1:
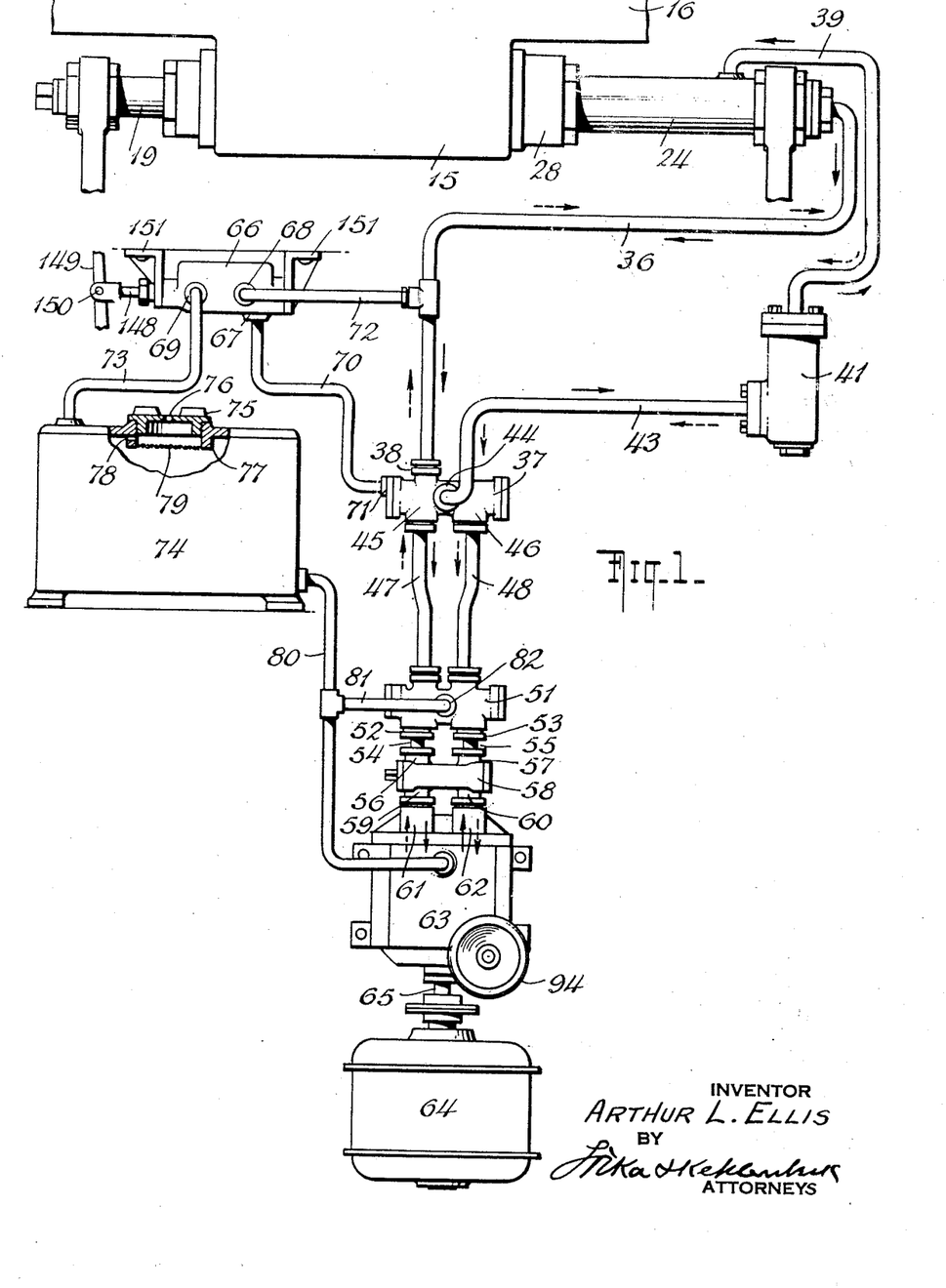
Fig. 1 is a diagrammatic view illustrating a hydraulic drive installation embodying the novel features.
Figures 2, 3, 4:
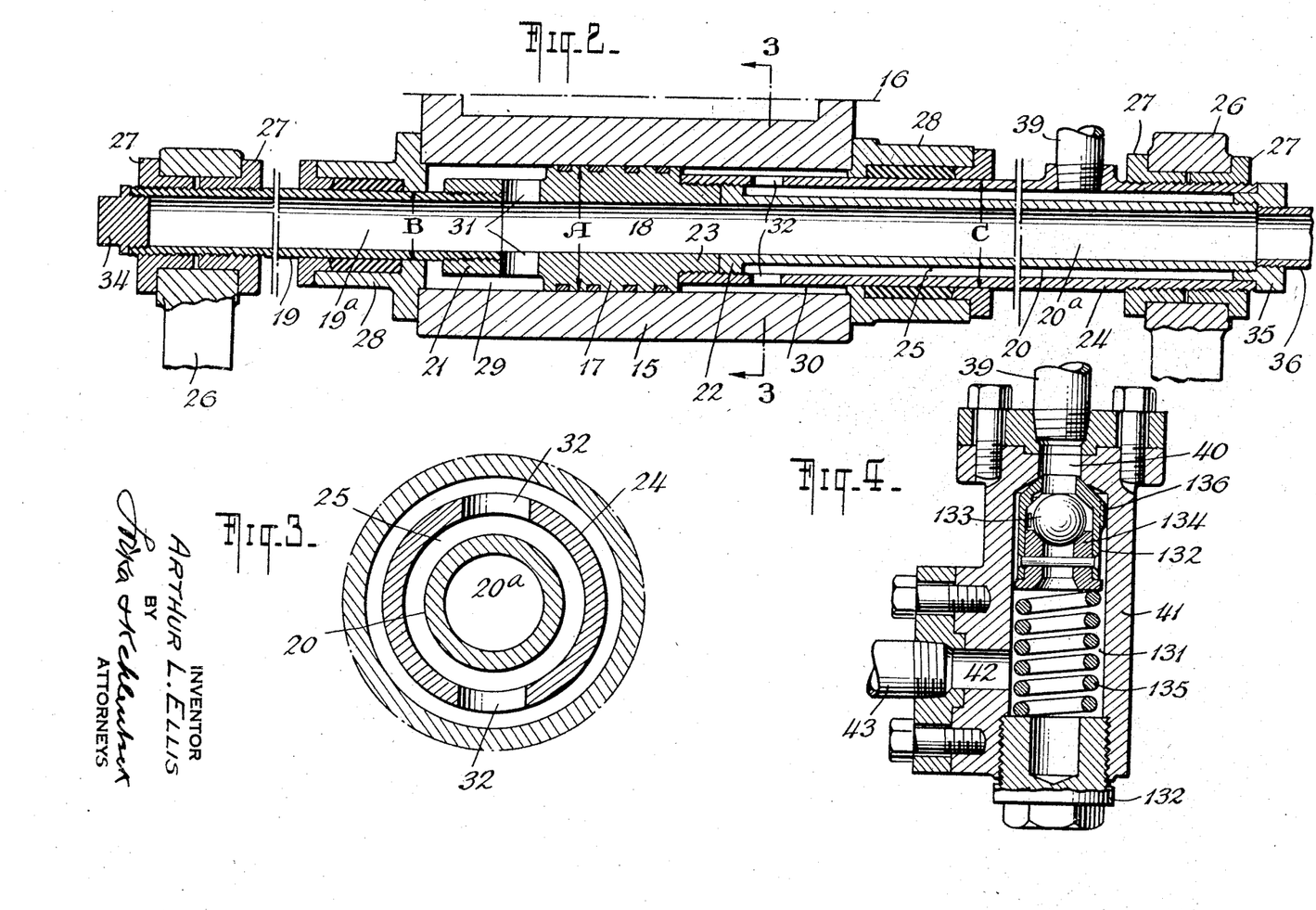
Fig. 2 is a fragmentary longitudinal section of the reciprocating means.
Fig. 3 is an enlarged cross-section thereof on the line 3—3 of Fig. 2.
Fig. 4 is a detail sectional view of a back-pressure valve included in the installation.

As shown in the illustrated example, a hydraulic cylinder 15 is suitably fastened to or connected with a planer table 16 or equivalent reciprocating element so as to partake of the reciprocating movements thereof. The cylinder 15 is slidably mounted upon a stationary piston 17 provided with an axial channel 18 communicating at its opposite ends with stationary hollow piston rods 19 and 20 respectively, as shown in Fig. 2; the arrangement is such that the bores of the piston rods 19 and 20 are in axial registry with the piston channel 18 so as to form therewith a continuous channel 19ᵃ—18—20ᵃ extending axially of the piston rods 19 and 20, and the piston 17. The piston 17 may be connected with the piston rods 19 and 20 in any suitable manner so as to be supported thereby and in the illustrated example is accordingly provided at one end with an internally threaded neck 21 for the accommodation of the piston rod 19 which is externally threaded at its inner end for connection with said neck 21. For connecting it with the piston 17, the piston rod 20 is provided, at its inner end, with an externally threaded boss 22 corresponding in diameter to and abutting an externally threaded neck 23 with which said piston 17 is provided at its other end; a tubular sleeve 24 which is internally screwthreaded at its inner end for threaded connection with the boss 22 and neck 23 whereby the piston 17 is connected with the piston rod 20 and the sleeve 24 itself is fixed in place. The tubular sleeve 24 surrounds the piston rod 20 at a distance to form an annular space 25 between itself and said piston rod 20 as shown in Fig. 2, for the purpose to be more fully described hereinafter. The assembly so far described is mounted in bearings 26 which may form parts of the planer table bed or its equivalent and is anchored in place by means of threaded collars 27 which are threaded upon the piston rod 19 and tubular sleeve 24 respectively, and fit into the bearings 26 as illustrated in Fig. 2.

The opposite ends of the cylinder 15 are closed by means of suitable closures such as conventional stuffing boxes 28 which are in slidable engagement respectively with the piston rod 19 and the tubular sleeve 24. With the illustrated arrangement the cylinder 15 is divided into two independent end chambers 29 and 30, the former of which communicates with the channel 19ª—18—20ª through ports 31 formed in and extending radially through the piston neck 21 as shown in Fig. 2; the piston chamber 30, in turn, is in communication with the annular space 25 between the piston rod 20 and the sleeve 24 through ports 32 formed in the latter, as illustrated in Fig. 2. In the example shown in the drawings the outer end of the piston rod 19 is suitably closed, as by means of a plug 34, to seal the one end of the channel 19ª—18—20ª, while the outer end of the annular space 25 is correspondingly sealed by a collar 35 which is threaded upon the piston rod 20 and projects into said space 25 as illustrated in Fig. 2.

The collar 35 is further internally threaded for connecting one end of a pipe 36 with the piston rod 20 so as to communicate with the axial passage 20ª—18—19ª as shown in Fig. 2; the other end of the pipe 36 is connected in any suitable manner with a differential valve 37, so as to communicate with a port 38 thereof. The annular space 25 is in communication with a pipe 39 which leads to the port 40 of a back-pressure valve 41, the latter having a second port 42 from which a pipe 43 leads to a second port 44 of the differential valve 37. Additional ports 45 and 46 are connected, by means of pipes 47 and 48 respectively with the ports 49 and 50 of a shuttle valve 51, which is provided with additional ports 52 and 53 connected by means of pipes 54 and 55, respectively, with the ports 56 and 57 of a by-pass relief valve 58. The latter includes additional ports 59 and 60 which are suitably connected with the ports 61 and 62 of a pump 63 driven in any suitable manner as by means of an electric motor 64 with which the driving shaft 65 of said pump in such case is coupled.

Figure 5:
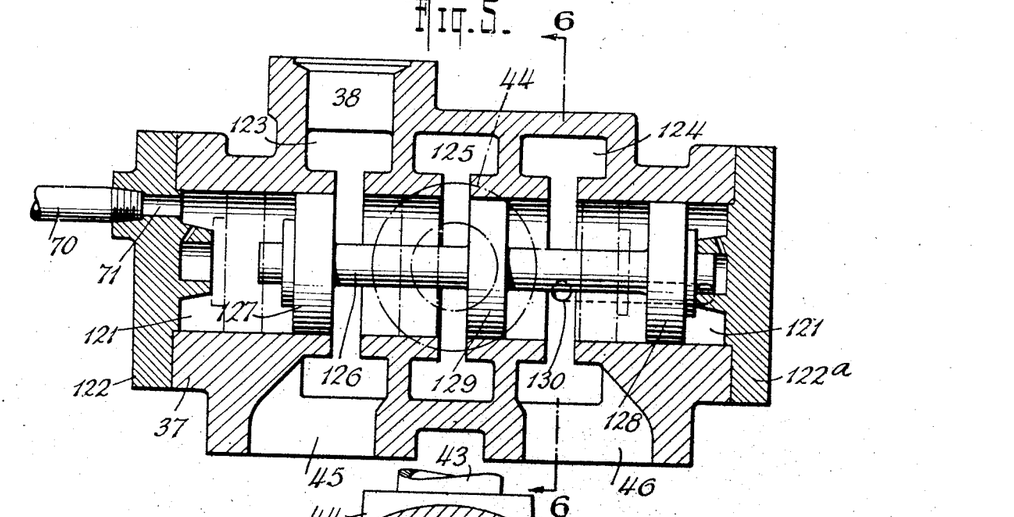
Fig. 5 is a detail longitudinal section of a differential valve forming part thereof.
Figure 7:
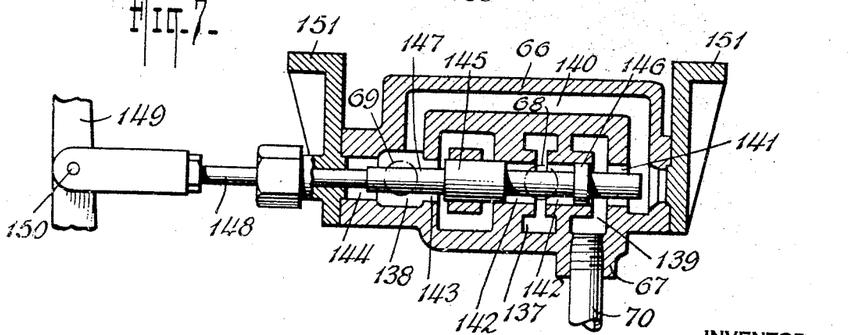
Fig. 7 is a detail sectional view of a control valve comprised in the novel arrangement.

In addition to the parts so far described, the installation includes a three-way control valve 66 having three ports 67, 68 and 69 as shown in Figs. 1 and 7. The port 67, as illustrated in Fig. 1, is connected by means of a pipe 70 with a port 71 with which the differential valve 37 is provided, as illustrated in Fig. 5; the port 68 is connected by means of a branch pipe 72 with the pipe 36 as shown in Fig. 1, while a pipe 73 leads from the port 69 to the upper part of an oil expansion tank 74 mounted at the highest point of the system and sufficiently large to take care of the volume of oil displaced by the hydraulic cylinder 15 and its associated elements during operative periods as will be more fully pointed out hereinafter. The tank 74 is provided with a filling opening normally closed by means of a removable closure 75 having a vent 76 open to the atmosphere as indicated in Fig. 1; a flange or skirt 77 depends below the filling opening into the tank 74 and is provided with one or more air holes 78, a wire mesh screen 79 being preferably secured to the lower edge of the flange 77 to strain the oil during filling of the tank 74 and to prevent oil therein from splashing out through the vent 76.

A pipe 80 leads from the lower portion of the tank 74 to the pump 63 and is connected, by means of a branch pipe 81 with a port 82 of the shuttle valve 51 as shown in Fig. 1.

Figure 11:
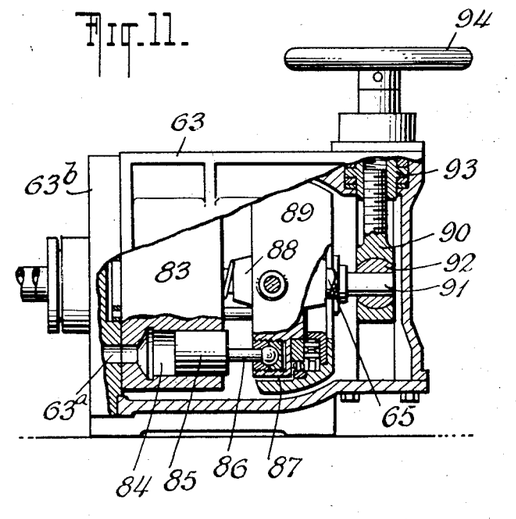
Fig. 11 is an elevation, partly in section, showing the pump unit of the drive.

The pump 63 is of the well known Waterbury type and as shown in Fig. 11 consists of a casing or housing in which a cylinder barrel 83 is rotatably mounted on the driving shaft 65, said barrel 83 being provided with a plurality of cylinders 84 in each of which is slidably mounted a piston 85 connected by a piston rod 86 with a swash plate 87; the cylinders 84 are each provided with outlets adapted to periodically register with ports 63ª in the valve plate 63ᵇ of the pump 63 whereby communication with the ports 59 and 60 of the by-pass relief valve 58 is established in predetermined succession. The swash plate 87 is connected in driving relationship with the driving shaft by means of an universal joint 88 and is rotatably mounted within a tilting box 89 capable of being adjusted to different angular positions relatively to the driving shaft 65. The tilting box 89 may be adjusted to different angular positions with respect to the driving shaft 65, for instance, by means of a control shaft 90 to the lower end of which the tilting box is connected by a stub shaft 91 and rocking bearing 92. At its upper end the control shaft 90 is threaded into a nut 93 mounted for rotation in the pump casing but held against axial movement therein. Secured to the nut 93 is a hand wheel 94, rotation of which obviously will produce a longitudinal movement of the control shaft 90 and thereby a change in the angular position of the tilting box 89 and swash plate 87. With the driving shaft 65 rotating in a given direction and with the control shaft set to the position shown in Fig. 11 in which the tilting box 89 and swash plate 87 are perpendicular to the driving shaft 65 the pistons 85 will have no stroke and the pump is in its "neutral" position. When, however, the control shaft 90 is adjusted to cause the tilting box 89 and swash plate 87 to be inclined in either direction from the perpendicular or neutral position, the pistons 85 will be reciprocated and fluid will be pumped by the pump through either of the pipes 59 or 60, the direction of flow depending upon the direction in which the control shaft 90 and tilting box 89 have been moved and the rate of flow depending on the extent of inclination given to said tilting box 89; obviously, the greater the extent of inclination the greater will be the stroke of the pistons 85 and the output of the pump.

Figure 10:
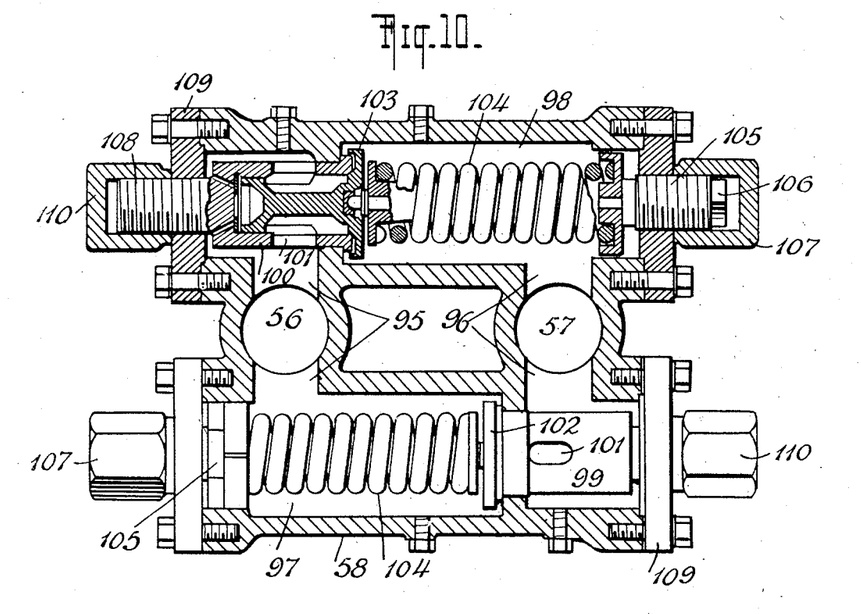
Fig. 10 is a sectional view of a by-pass relief valve forming part of the installation.

As shown in Fig. 10 the casing of the by-pass relief valve 58 is provided with channels 95 and 96 with the first of which the pipe 54 and port 59 are in communication, and with the other of which the pipe 55 and port 60 are connected, said ports 59 and 60, as previously stated, being in communication with the two sides of the pump 63 respectively. The channels 95 and 96 extend transversely between and connect two chambers 97 and 98 formed interiorly of the casing of the by-pass relief valve 58, as also illustrated in Fig. 10. The chambers 97 and 98 are respectively fitted with hollow valve cages 99 and 100 having openings 101 in communication with the channels 95 and 96 respectively and provided at one end with valve seats co-operating with valves 102 and 103 to control the by-pass connections in the manner to be more fully set forth hereinafter. The valves 102 and 103, which are located and operate in reverse directions, are maintained upon and returned to their respective seats by means of springs 104, the tension of which may be adjusted to determine the pressure at which said by-pass relief valve 58 operates, for instance, by means of adjusting devices 105 in threaded connection with the casing of the by-pass relief valve 58 and terminating exteriorly thereof in the form of rectangular heads 106 to facilitate the manipulation of said devices 105; to prevent unintentional disarrangement of the devices 105 the outer ends thereof may be covered by removable caps 107. To facilitate assembly and disassembly of the parts and to provide for additional adjustment, the valve cages 99 and 100 may be carried by threaded stems 108 in screwthreaded engagement with plates 109 removably fixed upon the casing of the by-pass relief valve 58, said stems 108 preferably having their external ends protected by removable caps 110.

Figure 8:
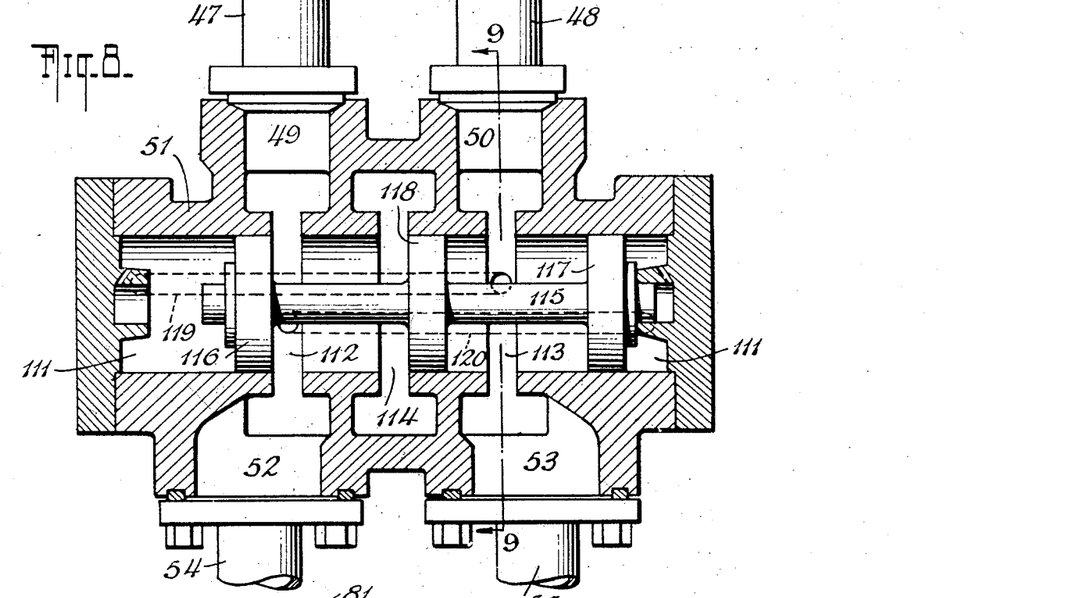
Fig. 8 is a longitudinal section of a shuttle valve embodied therein.
Figure 9:
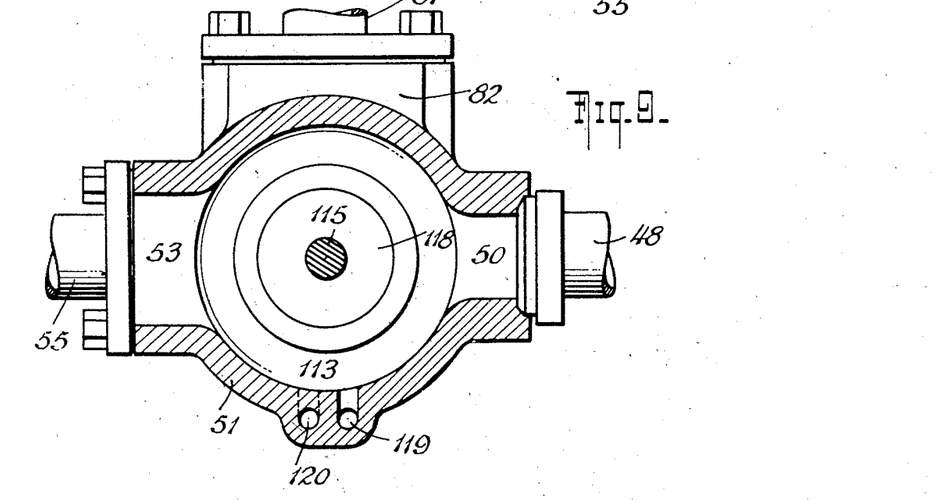
Fig. 9 is a cross-section on the line 9—9 of Fig. 8.

The shuttle valve 51, as illustrated in Fig. 8, is provided interiorly of its casing, with a valve chamber 111, closed at its opposite ends and divided by annular passages 112 and 113 whereby the ports 49 and 50 are respectively connected with each other across said valve chamber 111, and by an additional annular passage 114 which communicates with the branch pipe 81. A plunger 115 carrying three spaced valves 116, 117 and 118 is slidably mounted in said valve chamber 111; in addition to the above, the shuttle valve 51 includes a channel 119 leading from one end of the valve chamber 111 to the passage 113, and another channel 120 leading from the other end of said valve chamber 111 to the passage 112 as shown in Fig. 8.

Figure 6:
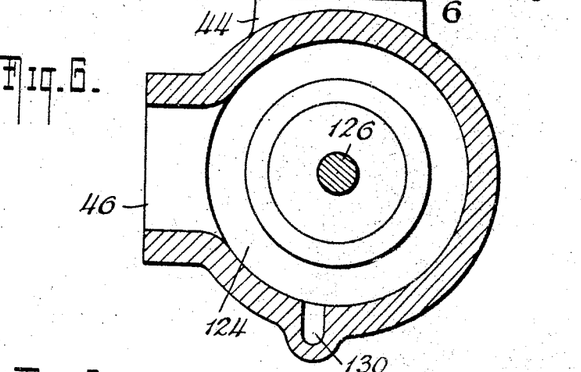
Fig. 6 is a sectional view on the line 6—6 of Fig. 5.

As illustrated in Fig. 5, the differential valve 37 is generally similar in construction to the shuttle valve 51, and is provided interiorly of its casing with a valve chamber 121, the opposite ends of which are closed by preferably removable plates 122 and 122ᵃ. The casing of the valve 37 further includes an annular passage 123 whereby the ports 38 and 45 are connected with each other, and an annular passage 124 which communicates with the port 46, said passages 123 and 124 extending across said valve chamber 121 for communication therewith, as shown in Fig. 5; an additional annular passage 125 in said casing of the valve 37 communicates with the port 44 and extends across the valve chamber 121 so as to also communicate therewith. A plunger 126 carrying three spaced valves 127, 128 and 129 is slidably mounted in the valve chamber 121, and the passage 124 is further connected with the end of the valve chamber 121 adjacent to the end plate 122ᵃ by means of a channel 130 preferably formed in the casing of said valve 37 as shown in Figs. 5 and 6.

The back-pressure valve 41 as shown in Fig. 4 of the drawings consists of a valve casing having a bore 131, one end of which is closed by a screw plug 132, and the other end of which has secured thereto a coupling flange provided with a screwthreaded aperture for the accommodation of the end of the pipe 39. The lateral port 42 of the back-pressure valve 41 communicates with the center aperture of a second coupling flange suitably secured to the valve casing and serving to receive the end of the pipe 43.

Mounted within the bore 131 of the casing of the valve 41 is a valve cage 132 in which is mounted a ball valve 133 adapted to seat against a valve seat formed on a plug 134 suitably secured in said cage 132. The latter is provided at one end with a valve seat normally held by means of a compression spring 135 against a co-operating valve surface formed adjacent to one end of the bore 131. The cage 132 is provided on its periphery with a plurality of longitudinally extendings ribs 136, spaced apart to form channels for the passage of the fluid.

As shown in Fig. 7 the casing of the three-way control valve 66 is provided with an internal chamber 137 with which the port 68 and pipe 72 are connected, and an internal chamber 138 leading to the port 69 and pipe 73; a further chamber 139 formed interiorly of said valve casing is in communication with the port 67 and pipe 70. As illustrated in Fig. 7 a channel 140 leads from the chamber 138 to a section 141 of an axial valve chamber which section 141 in turn leads to the chamber 139; the said axial valve chamber further includes a section 142 communicating with both of the chambers 139 and 137, and sections 143 and 144 projecting in opposite directions from and in communication with the chamber 138. The section 143 of said axial valve chamber is controlled by a slidable valve 145, and the sections 142 and 141 are controlled by a slidable valve 146, said valves 145 and 146 being carried by a plunger 147 slidably mounted in the valve casing and extending outwardly beyond the same at one end in the form of a valve rod 148. The latter may be automatically actuated by suitable electric or other mechanism to operate the valves 145 and 146, or as shown in Figs. 1 and 7 said valve rod 148 may be manually operated by means of a suitable lever 149 which in such case may be pivotally connected with the valve rod 148 at 150. It will be understood that the control valve 66 is mounted in the installation in any conventional manner as by means of supporting brackets 151.

During any given operative period the pump 63 is driven by the motor 64, the output and direction of operation being dependent upon the direction and degree of inclination of the swash plate 87 and tilting box 89; the adjustment of the latter and with it the swash plate 87, as previously stated, may be effected by a proper manipulation of the handwheel 94 and its associated elements.

The particular system, of which an example is shown in the drawings, is designed for use with hydraulically operated planers or other types of reciprocating machines in a manner to provide at least two distinct ranges of cutting or equivalent operative speeds for the planer table 16 or corresponding reciprocating element of other types of machines. With this result in view in the illustrated system, the differential valve 37 in combination with the three-way control valve 66 provides a means for selectively changing the net areas of the hydraulic cylinder 15 available for the cutting or other operative stroke of the planer table 16 or its equivalent. In an ordinary system of the indicated type, the net areas available for such cutting or other operative strokes would be the difference in area between the bore "A" of the cylinder 15 and the area "B" of the piston rod 19, while the net area available for the return stroke would be equal to the difference in area between the aforesaid bore "A" and the area "C" of the sleeve 24. By means of the differential valve 37 it is possible to put pressure upon both sides of the piston 17 at the same time for the cutting or other operative stroke, so that the net area available for said cutting or other operative stroke is equal to the difference between the previously mentioned net areas. That is the area available is equal to the area on the cutting or other operative stroke minus the area on the return stroke.

As an example, it may be stated that with a cylinder of given dimensions in which the net area available for the cutting or other operative stroke is 23.56 square inches, and the area available for the return stroke is 11.54 square inches, the net area available for the cutting or other operative stroke, when both ends of the cylinder 15 are under pressure, would be 12.02 square inches.

Thus, with the differential valve 37 in one position the speed of the cutting or other operative stroke would be, for instance, from 0 to 100 feet per minute, and the speed on the return stroke would be, for instance, from 0 to 203 feet per minute. When, however, the differential valve 37 is adjusted to deliver oil under pressure to both sides of the piston 17, or to both end chambers 29 and 30 of the cylinder 15, the cutting or other operative speed would range, for instance, from 0 to approximately 200 feet per minute, with a speed range up to 203 feet per minute on the return stroke. The thrust available, for the cutting or other operative stroke, therefore is in direct proportion to the speed range, and accordingly for the 100 feet per minute cutting or other operative speed, would be, for instance, 13,750 pounds; when, however, the pressure is applied to both sides of the piston 17 the maximum pressure available for said cutting or other operative stroke would be approximately one half of the aforesaid 13,750 pounds. The arrangement thus provides a maximum thrust at slow cutting or other operative speeds, and at the same time, provides a higher cutting or other operative speed with a lower thrust, if desired.

For purposes of description, it will be assumed that the pump 63 is supplying oil to the return side of the hydraulic cylinder 15 to shift the table 16 or its equivalent in a return stroke toward the right in Figs. 1 and 2, and that the valves 116, 117 and 118 of the shuttle valve 51 are in the position shown in Fig. 8 and that the valves 127, 128 and 129 of the differential valve 37 occupy the position indicated in dotted lines in Fig. 5; it will be understood that, as the oil flows in the direction indicated by solid arrows in Fig. 1, it partly passes through the channel 130 and, by pressure against the valve 128 adjusts the latter and its companion valves 129 and 127 to the aforesaid dotted line position in Fig. 5. At this stage, oil is accordingly being delivered as indicated by the aforesaid solid arrows in Fig. 1 from the right hand side of the pump 63 through the by-pass relief valve 58 and pipe 55 to the port 53 of the shuttle valve 51 and passes through the passage 113 thereof to the port 50 of said shuttle valve 51; some of this oil passes through the channel 119 to the left hand end of the valve chamber 111 and by acting on the valve 116 forces the latter and with it the valves 117 and 118 to the position illustrated in Fig. 8. From the port 50 the oil passes through the pipe 48 to the port 46 of the differential valve 37 and into the passage 124 thereof; from the latter the oil flows in an axial direction toward the left in Fig. 5, through the contiguous section of the valve chamber 121 into the annular passage 125 and to the port 44 and pipe 43, and partly through the channel 130 as above set forth. From the pipe 43 the oil travels through the back pressure valve 41 and pipe 39 to the annular space 25 and through the ports 32 to the end chamber 30 of the hydraulic cylinder 15. The oil pressure thus created in said chamber 30, by reaction against the stationary piston 17 and by pressure upon the right hand stuffing box 28, causes the cylinder 15 and with it the table 16 or its equivalent to move toward the right in Figs. 1 and 2 in a return stroke. During this operation the oil in the cylinder chamber 29 will be forced through the ports 31 and channel 18—20ᵃ to the pipe 36 and through the same to the port 38 of the differential valve 37. From said port 38 the oil passes through the passage 123 of said valve 37 to the port 45 thereof and from thence through the pipe 47 to the port 49 of the shuttle valve 51; continuing, as indicated by solid arrows in Fig. 1, the oil passes through the passage 112 of said shuttle valve 51 to the port 52 thereof and through the pipe 54 and by-pass relief valve 58 to the left hand side of the pump 63. During these operative steps the excess oil on the left-hand side of the cylinder 15 is being passed through the port 82 of the shuttle valve 51 and through the branch pipe 81 and pipe 80 and is thereby returned to the expansion tank 74.

By suitably operating the hand wheel 94 the tilting box 89 and swash plate 87 may be adjusted to reverse the flow of oil from the pump 63 so that, in such case, it would follow the course indicated by the dotted arrows in Fig. 1. Under such conditions the oil is being delivered from the left hand side of the pump 63 through the by-pass relief valve 58 and pipe 54 to the port 52 and passage 112 of the shuttle valve 51; part of the oil, at this stage, passes through the channel 120 to the right hand end of the valve chamber 111 and by acting upon the valve 117, shifts said valve and the valves 116 and 118 toward the left in Fig. 8. The oil expansion tank 74 is thereby connected with the right hand side of the pump 63 to permit oil from said tank 74 to flow to what, at this stage, is the suction side of said pump 63 to thereby supply the amount of oil necessary to keep the system filled.

From the passage 112 of the shuttle valve 51, the oil passes through the port 49 and pipe 47 to the port 45, chamber 123 and port 38 of the differential valve 37; from the port 38 the oil passes through the pipe 36 to the channel 20ᵃ—18—19ᵃ and out through the ports 31 to the end chamber 29 of the cylinder 15. As a result, the oil in said chamber 29, by reacting against the stationary piston 17 and by pressure against the left hand stuffing box 28 in Fig. 2, will force the cylinder 15 to the left in said figure and thereby cause the table 16 or its equivalent to move in a cutting or operative stroke toward the left in Figs. 1 and 2. If now the three-way control valve 66 is operated to move its plunger 147 and valves 145 and 146 toward the right in Fig. 7, its port 68 and the pipe 72 leading therefrom to the pipe 36 will be brought into communication with each other and with, what at this stage, is the pressure line of the system. Pressure oil accordingly will flow into the section 142 of the axial valve chamber and to the chamber 139 of said control valve 66 and from thence through the pipe 70 to the valve chamber 121 at the left-hand side of the differential valve 37. The oil pressure thereby developed in the left hand end of said chamber 121 will act upon the valve 127 and thus shift the plunger 126 and with it the valves 127, 128 and 129 toward the right to the position illustrated by solid lines in Fig. 5; during this operation, the oil which is in the valve chamber 121 to the right of the valve 128 will be forced through the channel 130 and passage 124 and pass into the pipe 48. In the described adjustment of the differential valve 37 the pipes 36 and 43 are both in communication with the annular passage 123 and with pipe 47. At this stage, with the oil flowing in the direction indicated by the dotted arrows in Fig. 1, the two ends of the hydraulic cylinder 15 are accordingly connected with each other so that the pressure oil from the pump 63 is coincidentally supplied to both sides of the piston 17. Under such conditions the hydraulic cylinder 15 will continue to move toward the left in Figs. 1 and 2 to move the table 16 or its equivalent in a cutting or other operative stroke, but at an increased speed.

With the three-way control valve 66 remaining in the last mentioned adjustment, the handwheel 94 is operated at the proper time to again reverse the output direction of the pump 63 and to cause the oil to again flow in the direction of the solid arrows in Fig. 1, in the manner previously indicated. As this occurs, part of the oil will again pass through the channel 119 to the left hand end of the valve chamber 111 and by acting on the valve 116 will move the plunger 115 and with it the valves 116, 117 and 118 of the shuttle valve 51 to the right to the position illustrated in Fig. 8. This adjustment of the shuttle valve 51 automatically takes care of the connection to the expansion tank 74 and at the same time permits the excess oil to pass through the branch pipe 81 and pipe 80 back to the expansion tank 74. As part of the oil, at this stage, again passes through the channel 130 to the right hand end of the valve chamber 121 into engagement with the valve 128, the plunger 126 and valves 127, 128 and 129 of said valve 37 will accordingly be moved to the left back to the dotted line position in Fig. 5 and consequently will break the communication between the annular passages 123 and 125, and therefore between the pipes 43 and 47, to thereby disconnect the two ends of the cylinder 15 from each other and permit oil under pressure to pass into the chamber 30 of the cylinder 15 whereby the latter and with it the table 16 or its equivalent are operated in the return direction as previously described herein.

From the above it will be obvious that it is possible to cause the table 16 or its equivalent to be operated to develop a cutting or other operative stroke at several different speeds with correspondingly different thrust developments, by simply operating the control valve 66 to bring about the necessary actuation of the differential valve 37. In other words the arrangement provides at least two ranges of cutting or other operative speeds, the speed variation being possible independently of the return speed, and the latter itself may be varied without affecting the cutting or other operative speed.

In the particular installation illustrated in the drawings, the only function of the back pressure valve 41 is to maintain back pressure on the return side of hydraulic cylinder 15 to thereby insure smoothness of action in the machine and to prevent jerkiness therein.

For the purpose of accommodating any excessive overloads, which may develop in the system, for instance in case the planer table 16 or its equivalent should stall against either one or the other end of the machine, the by-pass valve 58 is provided, which in effect constitutes a relief valve arranged to function when the pressure has built up to a predetermined amount, under circumstances for instance as set forth above. Under such conditions, oil from the pump 63, if delivered from the right hand side of said pump, will pass through the port 60 into the chamber 96 of said valve 58 and through the ports 101 into the cage 99 and accordingly will move the valve 102 from its seat; when the valve 102 is thus opened against the tension of its spring 104, the oil will pass through the chamber 97 and out of the port 59 back to the pump 63. Similarly, if the oil output is from the left hand side of the pump 63, the oil will pass through the port 59 into the chamber 95 and through the ports 101 into the cage 100; under the pressure of the oil in said cage 100 the valve 103 will be opened against its spring 104 so that the oil will pass into the chamber 98 and out through the port 60 back to the pump 63. It will be understood that the aforesaid by-passing of the oil will take place only after the pressure has been built up to an extent sufficient to overcome the tension of the springs 104; the latter may be adjusted to develop varying tensions and to thereby predetermine the pressure at which by-passing will begin. With this device injury to or disarrangement of the mechanism which otherwise might result from built up pressure is positively avoided.

The novel features, when embodied in reciprocating machine tools such as planers, milling machines and the like provide definite and specialized control for such machines and result in developing an increased efficiency therein.

Various changes in the specific forms shown and described may be made within the scope of the claims without departing from the spirit of the invention.

I claim:

1. In a hydraulic drive for a reciprocating member, a stationary piston having an axial passage, stationary hollow piston rods extending in opposite directions from said piston in communication with the axial passage thereof, a stationary sleeve connected with said piston and surrounding one of said piston rods in spaced relation thereto to form an annular space exteriorly of said one piston rod, a cylinder connected with said reciprocating member slidably mounted on said piston and divided thereby into two independent end chambers communicating respectively with the interiors of said piston rods and piston passage, and with said annular space, a hydraulic pump connected with the interior of said piston rods and piston passage for delivering fluid under pressure to said cylinder chambers, end means controlling the flow of fluid through said connections and movable to direct said fluid successively through said piston rods and piston passages and through said annular space to said cylinder chambers to reciprocate said cylinder, and to direct said fluid concurrently through said piston rods and piston passage and said annular space to said cylinder chambers to develop differential opposing pressures for selectively varying the speed of travel of said cylinder in one direction.

2. In a hydraulic drive for a reciprocating member, a stationary piston having an axial passage, stationary hollow piston rods extending in opposite directions from said piston in communication with the axial passage thereof, a stationary sleeve connected with said piston and surrounding one of said piston rods in spaced relation thereto to form an annular space exteriorly of said one piston rod, a cylinder connected with said reciprocating member slidably mounted on said piston and divided thereby into two independent end chambers communicating respectively with the interiors of said piston rods and piston passage, and with said annular space, a hydraulic pump connected with the interior of said piston rods and piston passage for delivering fluid under pressure to said cylinder chambers, a differential valve in said connections, and means for operating said differential valve to direct said fluid successively through said rods and piston passage and through said annular space to said cylinder chamber to reciprocate said cylinder, and to concurrently direct said fluid through said piston rods and piston chamber and through said annular space to said cylinder chambers to selectively vary the speed of travel of said cylinder in one direction.

3. In a hydraulic drive for a reciprocating member, a stationary piston having an axial passage, stationary hollow piston rods extending in opposite directions from said piston in communication with the axial passage thereof, a stationary sleeve connected with said piston and surrounding one of said piston rods in spaced relation thereto to form an annular space exteriorly of said one piston rod, a cylinder connected with said reciprocating member slidably mounted on said piston and divided thereby into two independent end chambers communicating respectively with the interiors of said piston rods and piston passage and with said annular space, a hydraulic pump connected with the interior of said piston rods and piston passage for delivering fluid under pressure to said cylinder chambers, a differential valve in said connections, and a controlling valve communicating with said connections for operating said differential valve to direct said fluid successively through said piston rods and piston passage and said annular space to said cylinder chambers to reciprocate said cylinder, and to concurrently direct said fluid through said piston rods and piston chamber and said annular space to said cylinder chambers to selectively vary the speed of travel of said cylinder in one direction.

4. In a hydraulic drive for a reciprocating member, a stationary piston having an axial passage, stationary hollow piston rods extending in opposite directions from said piston in communication with the axial passage thereof, a stationary sleeve connected with said piston and surrounding one of said piston rods in spaced relation thereto to form an annular space exteriorly of said one piston rod, a cylinder connected with said reciprocating member slidably mounted on said piston and divided thereby into two independent end chambers communicating respectively with the interiors of said piston rods and piston passage, and with said annular space, a hydraulic pump connected with the interior of said piston rods and piston passage for delivering fluid under pressure to said cylinder chambers, a differential valve in said connections, a controlling valve communicating with said connections for operating said differential valve to direct said fluid successively through said piston rods and piston passage and said annular space to said cylinder chambers to reciprocate said cylinder, and to concurrently direct said fluid through said piston rods and piston chamber and said annular space to said cylinder chambers to selectively vary the speed of travel of said cylinder in one direction, and a shuttle valve in said connections operated by diverted pressure fluid for automatically restoring said differential valve to its normal position.

5. In a hydraulic drive for a reciprocating member, a stationary piston having an axial passage, stationary hollow piston rods extending in opposite directions from said piston in communication with the axial passage thereof, a stationary sleeve connected with said piston and surrounding one of said pistons in spaced relation thereto to form an annular space exteriorly of said one pistons, a cylinder connected with said reciprocating member slidably mounted on said piston and divided thereby into two independent end chambers communicating respectively with the interiors of said piston rods and piston passage, and with said annular space, a hydraulic pump connected with the interior of said piston rods and piston passage for delivering fluid under pressure to said cylinder chambers, a differential valve in said connections, a controlling valve communicating with said connections for operating said differential valve to direct said fluid successively through said piston rods and piston passage and said annular space to said cylinder chambers to reciprocate said cylinder, and to concurrently direct said fluid through said piston rods and piston chamber and said annular space to said cylinder chambers to selectively vary the speed of travel of said cylinder in one direction, a shuttle valve in said connections operated by diverted pressure fluid for automatically restoring said differential valve to its normal position, and a fluid expansion tank connected with said shuttle valve for supplying a receiving fluid to and from the fluid circuit to automatically control the supply of fluid in said circuit in accordance with the operative requirements of said reciprocating member, independently of the action of said hydraulic pump.

6. In a hydraulic drive for a reciprocating member, a stationary piston having an axial passage, stationary hollow pistons extending in opposite directions from said piston in communication with the axial passage thereof, a stationary sleeve connected with said piston and surrounding one of said piston rods in spaced relation thereto to form an annular space exteriorly of said one piston, a cylinder connected with said reciprocating member slidably mounted on said piston and divided thereby into two independent end chambers communicating respectively with the interiors of said piston rods and piston passage, and with said annular space, a hydraulic pump connected with the interior of said piston rods and piston passage for delivering fluid under pressure to said cylinder chambers, a differential valve in said connections, a controlling valve communicating with said connections for operating said differential valve to direct said fluid successively through said piston rods and piston passage and said annular space to said cylinder chambers to reciprocate said cylinder, and to concurrently direct said fluid through said piston rods and piston chamber and said annular space to said cylinder chambers to selectively vary the speed of travel of said cylinder in one direction, a shuttle valve in said connections operated by diverted pressure fluid for automatically restoring said differential valve to its normal position, and a by-pass relief valve in said connections for relieving developed excess pressure and for by-passing the fluid back to the pump.

7. In a hydraulic drive for a reciprocating member, a stationary piston having an axial passage, stationary hollow piston rods extending in opposite directions from said piston in communication with the axial passage thereof, a stationary sleeve connected with said piston and surrounding one of said piston rods in spaced relation thereto to form an annular space exteriorly of said one piston rods, a cylinder connected with said reciprocating member slidably mounted on said piston and divided thereby into two independent end chambers communicating respectively with the interiors of said piston rods and piston passage, and with said annular space, a hydraulic pump connected with the interior of said piston rods and piston passage for delivering fluid under pressure to said cylinder chambers, a differential valve in said connections, a controlling valve communicating with said connections for operating said differential valve to direct said fluid successively through said piston rods and piston passage and said annular space to said cylinder chambers to reciprocate said cylinder, and to concurrently direct said fluid through said piston rods and piston chamber and said annular space to said cylinder chambers to selectively vary the speed of travel of said cylinder in one direction, and a back pressure valve in said connection for maintaining back pressure on one side of said cylinder to prevent uneven operation thereof.

8. In a hydraulic drive for a reciprocating member, a fluid pressure cylinder and a piston, one of said last-mentioned two elements being adapted for reciprocation relatively to the other element and said piston having differential effective areas on opposite sides, a hydraulic pump connected with said elements for delivering fluid under pressure thereto, a differential valve in said connections, means for operating said differential valve to direct said fluid successively to opposite sides of said piston for reciprocating said reciprocable element, and to concurrently direct said fluid to both sides of said piston to selectively vary the speed of travel of said reciprocable element in one direction, and means in said connections operated by pressure fluid diverted from the main flow for automatically restoring said differential valve to a position in which said opposite sides of said piston are in communication with the pressure and suction sides of said pump respectively.

In testimony whereof I have hereunto set my hand.

ARTHUR L. ELLIS.